May 1, 1934.    D. E. RUTISHAUSER    1,956,628
METHOD OF AND MEANS FOR DEHYDRATING GLASS ENCLOSED SPACES
Filed Nov. 5, 1931
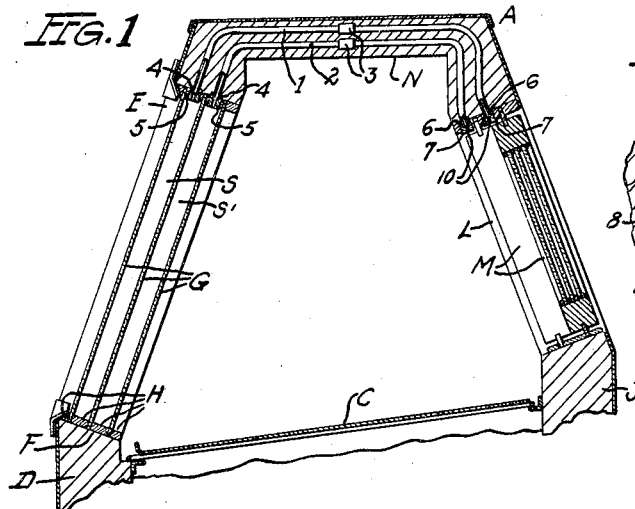
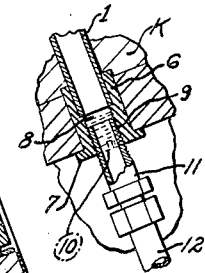
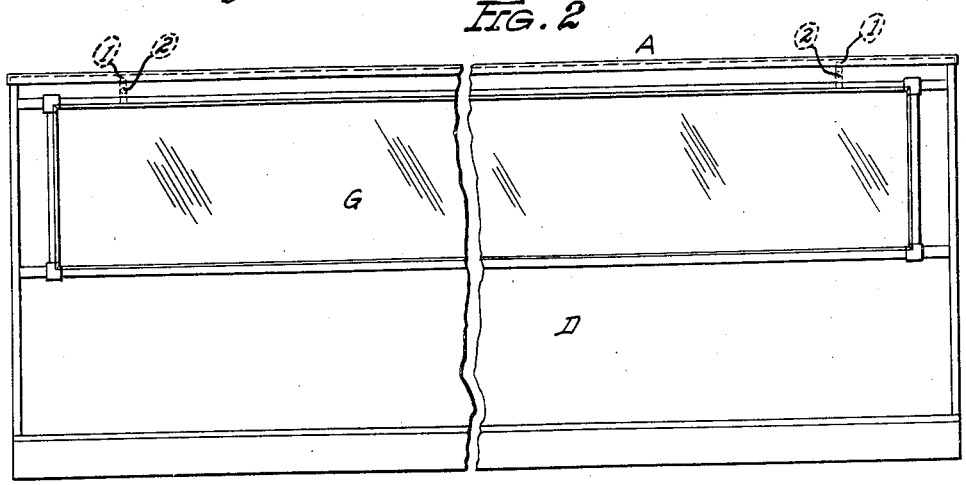
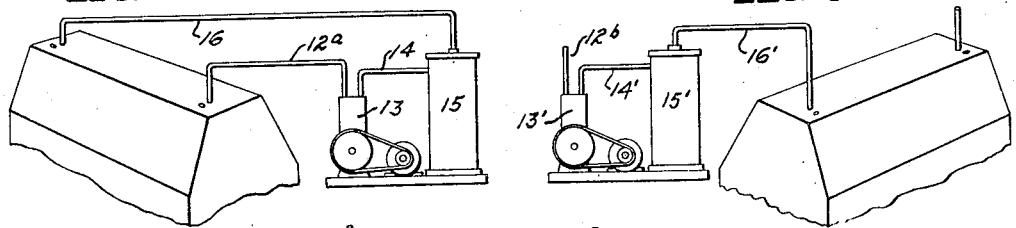
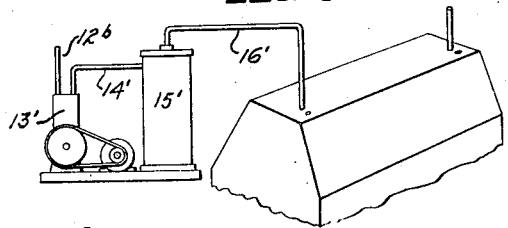
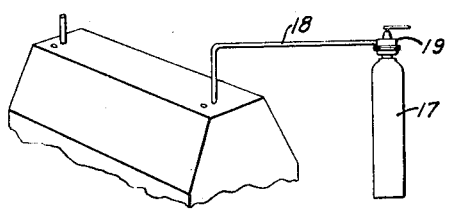
INVENTOR
D. E. RUTISHAUSER
By J. S. Cook
ATTORNEY Patented May 1, 1934

1,956,628

UNITED STATES PATENT OFFICE 1,956,628

METHOD OF AND MEANS FOR DEHYDRATING GLASS-ENCLOSED SPACES

Donald E. Rutishauser, St. Louis, Mo., assignor to Hussmann-Ligonier Company, St. Louis, Mo., a corporation of Delaware Application November 5, 1931, Serial No. 573,179

4 Claims. (Cl. 20—56.5)

This invention relates generally to methods of and means for dehydrating glass-enclosed spaces, and more specifically to an improved method and means for removing from spaces between layers of glass of transparent walls of refrigerated display cases moist air which tends to cause said layers of glass to become fogged, the predominant object of the invention being to provide a novel method and means whereby damp air may be removed from the spaces referred to and replaced by clean, dry air in order to avoid fogging of the layers of glass which enclose said spaces.

It is quite well known that refrigerated display cases for foodstuffs are in general use which include transparent wall portions through which the goods displayed within the display cases may be viewed. These transparent wall portions in most cases are comprised of a plurality of layers of glass which are spaced apart so as to provide spaces therebetween. Prior to this invention considerable inconvenience and annoyance was occasioned by the formation of moisture on the faces of the layers of glass at the inner or space sides of said layers of glass, as such moisture caused the transparent wall portions of the display cases to be fogged, whereby visibility through said transparent wall portions was impaired.

The predominant reason for the formation of moisture on the inner faces of the layers of glass is that the work of glazing of the transparent wall portions of the display cases is frequently performed at a time when and at a place where the atmosphere is quite damp. The result of this is that as the work of glazing the transparent wall portions progresses, damp air is trapped and sealed in the spaces between the layers of glass. The display cases then go into use and when, because of the refrigeration of the cases, the temperature of the layers of glass is reduced below the dew point of the air trapped in the spaces between said layers of glass, moisture in the trapped air is deposited on the layers of glass.

Prior to this invention no effectual means was available for eliminating the annoyance and inconvenience referred to above, and I therefore devised the improved method and means disclosed herein which, briefly stated, involves glazing the transparent wall portions of the display cases without regard for the prevailing atmospheric conditions at the time and place of such work, and after such work has been completed, withdrawing from the spaces between the layers of glass the air trapped therein and replacing said air with absolutely dry and filtered air or other gaseous fluid. Thus the spaces between the layers of glass of the transparent wall portions will contain dry air or other gaseous fluid which will not be affected by difference in temperature of the layers of glass in a manner to cause fogging of said transparent wall portions.

Fig. 1 is a vertical section of the upper portion of a refrigerated display case constructed in accordance with this invention.

Fig. 2 is a front elevation of a display case constructed in accordance with this invention, a portion thereof being broken away to conserve space.

Fig. 3 is a fragmentary sectional detail illustrating the manner in which the necessary equipment is associated with the display case when said case is being serviced in accordance with this invention.

Figs. 4, 5, and 6 illustrate different methods of carrying out my invention.

In the drawing, wherein are shown for the purpose of illustration, merely, several embodiments of the invention, and referring particularly for the moment to Fig. 1, A designates a refrigerated display case. The display case A is provided with the usual display compartment B, in the lower portion of which a shelf C is disposed. The upper portion of the front wall D of the display case A is inclined as indicated at E, and said inclined wall portion E is provided with an opening F in which a plurality of layers of glass G are arranged in spaced relation. In the particular display case illustrated in Fig. 1 there are three layers of glass G, and these layers of glass are spaced with respect to each other so as to provide spaces S and S' between said layers of glass. The layers of glass G are maintained in their spaced relation by suitable means such as the elements H, or any other means which would serve the purpose. The display case A includes a rear wall J provided with an inclined upper portion K in which a door opening L is arranged, said door opening being closed by suitable movable doors such as the sliding doors M illustrated in Fig. 1. The display case is also provided with a top wall N, and all of the walls of said display case are of the usual insulated construction to prevent loss of refrigeration therethrough.

At each end of the refrigerated display case illustrated in Figs. 1 and 2, I arrange a pair of conductors 1 and 2 which communicate respectively with the spaces S and S'. The conductors are embedded in the top wall N of the display case, and portions of said conductors are bent and extend downwardly through the upper portion of the inclined front wall portion E of the display case. Also the opposite end portions of the conductors 1 and 2 are bent and extend downwardly through the upper portion of the inclined rear wall portion K to points adjacent to the top wall of the door opening L. Preferably, though not necessarily, the conductors 1 and 2 are each made in two sections which are suitably connected together at the approximate longitudinal center of the conductor by a sleeve 3.

In order to place the conductors 1 and 2 in communication with the spaces S and S' between the layers of glass G I associate with each conductor a sleeve 4 which is provided at its lower end with an angular flange 5. The sleeves 4 are secured on end portions of the conductors 1 and 2 and are driven into openings formed in portions of the elements H which maintain the spaced relation of the layers of glass G and in adjacent portions of the front wall of the display case. Each of the sleeves 4 is provided with a passageway formed therethrough which communicates with the passageway through the associated conductor, and also this passageway through the sleeve communicates with the space S or S', as the case may be, with which the sleeve is associated.

At the end of each of the conductors 1 and 2 opposite to the end thereof at which the sleeve 4 is located, I provide a similar sleeve 6 which, as in the case of the sleeves 4, is provided at its lower end with an annular flange 7. The sleeves 6 are secured on end portions of the associated conductors 1 and 2, and said sleeves are driven into apertures formed in the rear wall portions K of the display case at the top wall of the door opening L therein. As shown most clearly in Fig. 3, the passageway formed through each sleeve 6 communicates with the passageway through the associated tube, and the lower portion of said passageway 8 is screw-threaded as indicated at 9 in Fig. 3. It will be noted by referring to Fig. 1 that the sleeves 6 extend slightly beyond the surface of the top wall of the door opening L, but such extension is not of sufficient degree to interfere with free movement of the doors M.

When dry air or other gaseous fluid has been introduced into the spaces S and S', the passageways 8 in the sleeves 6 are closed by suitable screw-threaded plugs 10 which are screwed into the screw-threaded lower ends of said passageways, as indicated in Fig. 1.

It will be noted, as already stated, that each space S has associated with it conductors 1 at opposite ends thereof, and also that each space S' has associated with it conductors 2 at its opposite ends. Assuming now that it is desired to remove moist air from the spaces S and S' and replace said moist air with dry air or other gaseous fluid, the plugs 10 are removed from the sleeves 6 of the conductors 1 or 2 associated with the space to be treated. A suitable pipe nipple, such as that designated by the reference character 11 in Fig. 3, is screwed into the sleeve 6 of one of the conductors associated with the particular space being treated and suitable equipment is connected to said pipe nipple by a flexible tubular element 12, which equipment is operable to either draw or force the air in the space therefrom. The equipment referred to also serves to replace the air so drawn or forced from the space with dry, treated air, or other gaseous fluid which is not susceptible to temperature changes of the display case in a manner to cause the layers of glass G to be fogged. After the moist air in the spaces has been removed therefrom and replaced by dry air, or other gaseous fluid, the plugs 10 are inserted in place to seal the passageways 8 in the sleeves 6, whereby the dry air or other gaseous fluid is sealed within the space treated.

Various apparatus and methods of operation may be employed in removing moist air from the spaces S and S' and replacing it with dry, treated air, or other gaseous fluids, and for the sake of completeness of disclosure of the invention I have illustrated in diagrammatical form in Figs. 4, 5, and 6 three of such apparatus and methods.

In Fig. 4 I illustrate what might be termed the "recirculating" method. In following out this method, I connect a suitable suction device 13 to the sleeve 6 of one of the conductors 1 or 2 of the space to be treated with the aid of a tubular element 12$^a$ and a pipe nipple such as that which is designted by the reference character 11 in Fig. 3. The suction device 13 is, of course, power driven and is connected by a conductor 14 to a suitable air drying and filtering means 15, the outlet of this air drying and filtering means being connected by a tubular element 16 to the sleeve 6 associated with the conductor 1 or 2 at the opposite end of the space being treated. The suction apparatus is placed in operation and the air within the space being treated is drawn therefrom by the suction device and is passed through the air drying and filtering means, after which said air passes back into the space being treated through the tubular element 16. Finally the operation is completed by disconnecting the conductor 12$^a$ and element 16, removing the pipe nipples 11, and replacing the plugs 10 so as to prevent escape of the dry, treated air from the space.

In following out the method illustrated in Fig. 5, the air drying and filtering means 15' is connected by a tubular element 16' to a pipe nipple associated with the sleeve 6 associated with one of the conductors 1 or 2 associated with the space to be treated. The suction device 13' is then placed in operation and air is drawn into the suction device through the element 12$^b$ and is conducted through the tubular element 14' to the air drying and filtering means wherein said air is dried and treated. The air is then forced into the space being treated through the tubular element 16' and the passage of said air into said space will force the moist air from the space through the conductor 1 or 2 which is open to atmosphere at the opposite end of the space being treated.

In Fig. 6 I illustrate a method which involves connecting a container 17 of dry and filtered air or other gaseous fluid to the sleeve of one of the conductors 1 or 2 of the space to be treated with the aid of a tubular element 18. The valve element 19 associated with the container 17 is then moved to an open position whereupon the gaseous fluid, which is under pressure within the container 17, will flow into the space being treated and will force the moist air therefrom through the conductor 1 or 2 at the opposite end of the space which is open to atmosphere.

From the foregoing, it is plain that the moist air is very effectively and completely removed from the spaces S and S' and is replaced by dry, filtered air which is incapable of causing the layers of glass G to become fogged when the temperature of the display case is altered.

While the drawing in Fig. 1 illustrates the conductors 1 and 2 as being embedded in a solid top wall, it is to be understood that this was done as a matter of convenience. In reality all of the walls of the display case A are provided with cork fillers which provide said walls with the proper insulating qualities, and the conductors 1 and 2 are set in the cork fillers of the walls when said walls are being constructed. However, as the precise construction of the walls of the display case does not form a part of the present invention, it is thought to be unnecessary to complicate this specification with a detailed description thereof.

For the sake of convenience and to avoid unnecessary language, I have referred to the moist or otherwise undesirable fluid which is withdrawn from the spaces between layers of glass of the transparent wall portions as being air. It is to be understood, however, that the use of this term is not intended as a limitation as to the character of the fluid that is withdrawn from the spaces mentioned, as a gas other than air which has previously been introduced into the spaces may be withdrawn because it has become moist through leakage of moist air into the spaces. I wish it to be understood, therefore, that the gaseous fluid which is withdrawn from the spaces between the layers of glass may be air, or a gas other than air, or a mixture of air and such a gas. Also, as already stated, the dry, gaseous fluid which is introduced into the spaces may likewise be air, or a gas other than air, or a mixture of air and such a gas.

I claim:

1. A refrigerated display case having a transparent wall portion comprised of spaced layers of transparent material providing an enclosed space and a door opening having a door associated therewith, and means for changing the gaseous fluid within said enclosed space, said means including a passageway leading into said space, the inlet end of said passageway being located within said door opening, and a discharge passageway leading from said space.

2. A refrigerated display case having a transparent wall portion comprised of spaced layers of transparent material providing an enclosed space and a door opening having a door associated therewith, and means for changing the gaseous fluid within said enclosed space, said means including a passageway leading into said space, the inlet end of said passageway being located within said door opening, and a discharge passageway leading from said space and having its discharge end located within said door opening.

3. A refrigerated display case having a transparent wall portion comprised of spaced layers of transparent material providing an enclosed space and a door opening in opposed relation with respect to said transparent wall portion and having a door associated therewith, and means for changing the gaseous fluid within said enclosed space, said means including a passageway leading into said space, said passageway being embedded in the top wall of said refrigerated display case and the inlet end of said passageway being located within said door opening, and a discharge passageway leading from said space.

4. A refrigerated display case having a transparent wall portion comprised of spaced layers of transparent material providing an enclosed space and a door opening in opposed relation with respect to said transparent wall portion and having a door associated therewith, and means for changing the gaseous fluid within said enclosed space, said means including a passageway leading into said space, said passageway being embedded in the top wall of said refrigerated display case and the inlet end of said passageway being located within said door opening, and a discharge passageway leading from said space, said discharge passageway being likewise embedded in the top wall of the refrigerated display case and having its discharge end located within said door opening.

DONALD E. RUTISHAUSER.